March 30, 1937. R. L. HOLLINGSWORTH 2,075,285
ECHO RECORDING APPARATUS
Filed Oct. 1, 1934
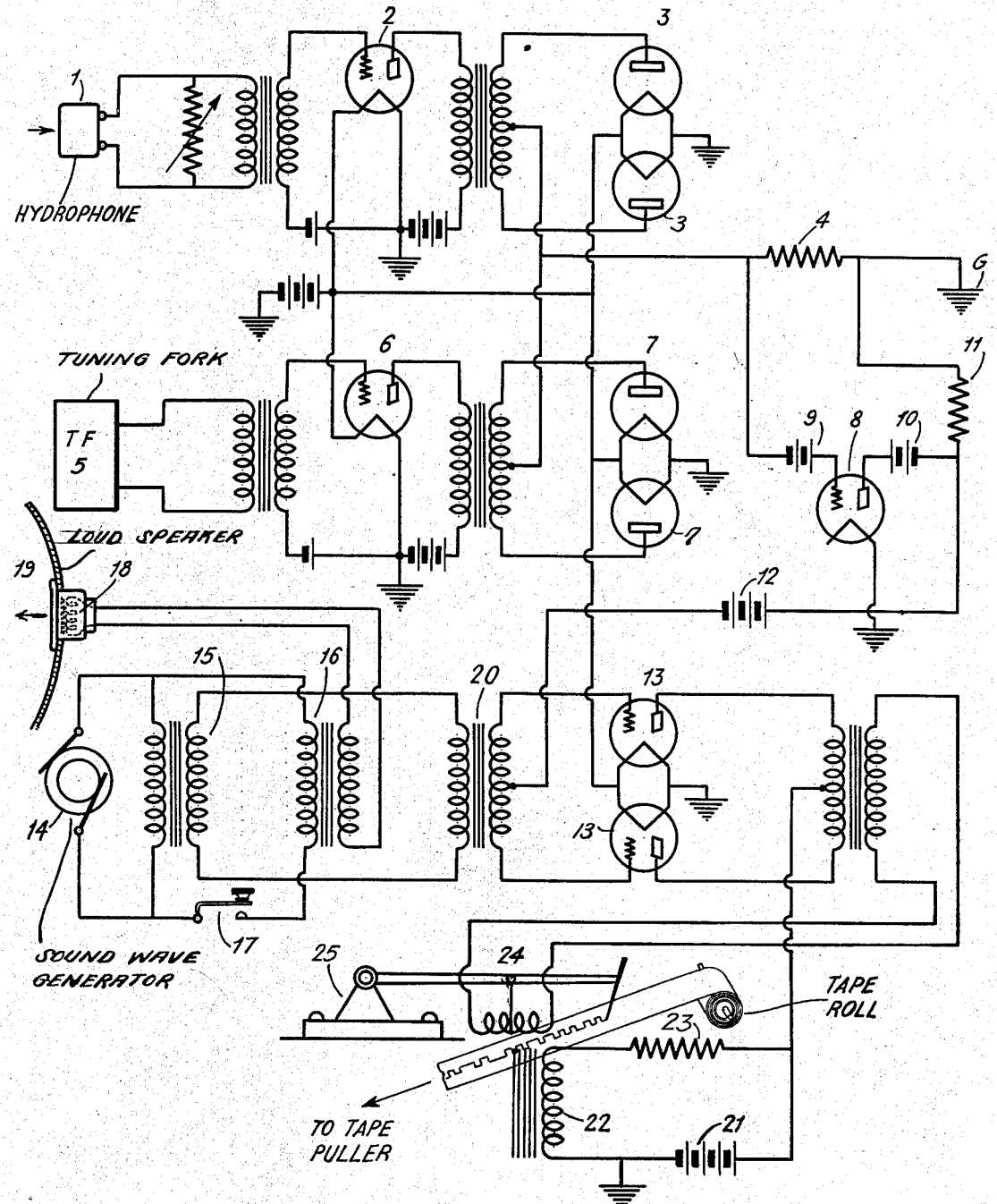
INVENTOR
R. L. HOLLINGSWORTH
BY 
ATTORNEY Patented Mar. 30, 1937

2,075,285

UNITED STATES PATENT OFFICE 2,075,285

ECHO RECORDING APPARATUS

R. Lee Hollingsworth, Riverhead, N. Y., assignor to Radio Corporation of America, a corporation of Delaware Application October 1, 1934, Serial No. 746,359

1 Claim. (Cl. 177—386)

This method of echo time recording is adapted to be used to record the time required for a sound wave to travel from any source to a reflecting object and back to said source. The method and means of the present invention is particularly adapted to use on ships at sea for measuring the depth of water in which the ship is located.

In its broadest aspect, my method and means for measuring distance by recording time in which a sound wave is traveling between two points comprises a means of supplying to a recorder a constant number of electrical impulses per second through a vacuum tube relay, and means for sending out sound waves electrically. The transmitted sound waves are recorded at the instant of transmission, and the echo of the sound wave or signal picked up by hydrophones and superimposed or recorded in tandem with the recording of the constant impulses provides a simple and accurate means of calculating the depth of the water by using the constant recorded impulses as a time constant for measuring purposes. The invention is of wide application and may be used on aircraft, such as dirigibles and airplanes, for measuring the distance between the same and earth or any reflecting object.

The novel features of my invention have been pointed out with particularity in the claim appended hereto.

The following description, together with the single figure in the drawing, explains the working principles of this system. The drawing is utilized for purposes of illustration only and is not intended to limit my invention to any particular circuit since obviously many departures from the circuit arrangement shown may be made without departing from the spirit of the invention.

In the drawing: 1 is a hydrophone located at an appropriate position on the hull of the ship. The hydrophone is as shown coupled to a vacuum tube amplifier 2, which excites the rectifier stage 3. The output of the rectifier stage 3 is connected as shown, so that current therein flows to ground G by way of resistance 4. A tuning fork 5 supplies exciting energy at a constant frequency, say of 110 cycles per second, to a thermionic amplifier 6 of the vacuum tube type, which in turn supplies energy to the input circuit of a second thermionic rectifier 7, the output of which is completed to ground by way of a resistance 4, so that current flowing in the output of the rectifier 7 must pass through the resistance 4.

An alternator 14 delivers a desirable frequency for submarine signal work, or a frequency desirable for distance measuring from aircraft, to transformers 15, 16 and 20. Transformer 16 is supplied with power from source 14 when the key 17 is closed, which in turn supplies exciting energy of the desired frequency to the sound wave transmitter 19, by way of the driving or exciting coil 18. Transformer 15 supplies the alternator energy continuously to the grids of the tubes in a vacuum tube relaying stage 13. The control grids of the tubes in stage 13 are biased by source 12 connected as shown, and a potential drop through resistance 11 derived in a manner which appears hereinafter in detail to a point at which the tubes are normally cut off or non-conductive.

The thermionic tube 8, which has been termed the "keyer" tube, has its control grid biased positive by means of a source 9 to a point at which current supplied by the source 10 normally flows between the anode and cathode of 8 by way of the anode circuit, including the source 10, resistance 11 and ground G. The potential drop produced in 11 by this current when added to the negative potential supplied by 12 to the control grids of the tubes in stage 13, biases said tubes to cut off, as stated above.

In describing the operation of the system, let us assume that the key 17 is closed and the sound transmitter 19 sends out sound waves. This energy is picked up by the hydrophone 1 direct and is amplified in the thermionic amplifying stage 2 and rectified in 3 and passes to ground through 3 and resistance 4. Vacuum tube keyer 8 has a positive bias applied to its grid by battery 9 and normally draws plate current from the source 10. As the rectified signal passes through resistance 4 a negative voltage produced in 4 counteracts the positive grid potential supplied by 9, thereby cutting off or lowering considerably the plate current in the tube 8. This tube then becomes substantially non-conductive and the current ceases to flow from the source 10 through the tube to ground. When the plate current through 8 is cut off, no current flows in resistance 11 and the voltage drop through 11 falls to zero, allowing bias from the source 12 alone to be applied to the relaying amplifying stage 13, which is normally blocked when 8 is drawing plate current. Consequently, the incoming signal received on hydrophone 1 directly from the transmitter 19 reduces the negative bias of the grids of the tubes in stage 13, allowing excitation of the grids of the tubes of stage 13 by source of energy 14 through transformers 15 and 20. This amplified and repeated energy from 14 in turn energizes the winding on the recording armature 24 which is placed in the strong magnetic field produced by field coil 22; 21 is the battery supply for 22 and the anode supply for the tubes of stage 13; 23 is a resistance in circuit with the winding 22 to protect the same against short circuiting.

The impulses from the tuning fork 5 reach the winding on the recording armature 24 by way of thermionic amplifier 6, rectifier 7, resistance 4, keying stage 8, and amplifying relaying stage 13, in the same manner in which the energy from 14 reaches said armature, as described above, when stage 13 is rendered conductive on the reception of an echo of the transmitted signal. In other words, when the tuning fork starts operating, energy is impressed on the rectifier 7 and direct current components passing through the resistance 4 counteract the effect of source 9 on the grid of tube 8, which is normally conductive, to render the same non-conductive, thereby reducing the potential drop through 11 and consequently increasing the conductivity of the tubes in stage 13. In this manner, the energy from the tuning fork 5 operates the armature 24 continuously at 110 impulses per second.

Now, for the reasons described above in detail, when the key 17 is pressed a dash is made instantly on the recording apparatus. The sound which has been recorded also travels to the bottom of the body of water or to earth from an airplane or to some reflecting object, and is reflected back to the hydrophone 1. This echo passes through the amplifier 2 and rectifier 3 and operates as set forth in detail to record an impulse by way of the recording apparatus 24, 25. Now, if the number of impulses recorded in response to the vibrations of the tuning fork be counted between the recording of the transmitted signal and the recording of the echo of the transmitted signal, the depth of the water in which the boat is located or the distance from the aircraft to earth or other reflecting object may be calculated immediately. In calculating the distance it may be assumed that sound travels through water at about 4,400 feet per second, allowing 20 feet for each of the tuning fork impulses.

I claim:

A distance measuring device comprising in combination a source of wave energy, means under control of said source for transmitting sound signals at the frequency of said wave energy, means including receiving apparatus for detecting said sound waves at the moment of transmission and also at the moment of reception after reflection from a remote object, means for translating the detected sound waves into electrical waves, a source of electrical oscillations of predetermined frequency, means for combining in one circuit the electrical waves corresponding to the sound waves and the oscillations of said predetermined frequency, an impedance network adapted to be rendered conductive in response to the translation of said sound waves into electrical waves and a recording apparatus operable under control of impulses from said impedance network for indicating elapsed time between the moment of sending and the moment of receipt after reflection of a given sound wave, said elapsed time being measured in terms of wave cycles of said source of electrical oscillations.

R. LEE HOLLINGSWORTH.